Oct. 5, 1948.　　　J. A. LUTHER　　　2,450,519
BELT CONNECTOR
Filed March 24, 1944
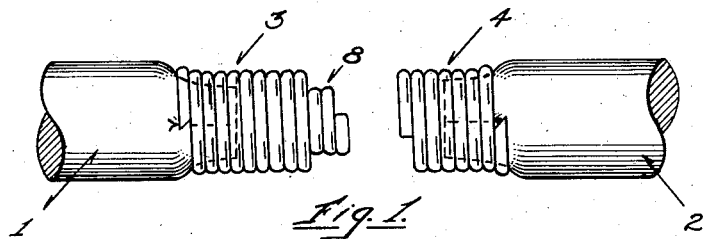
Fig. 1.
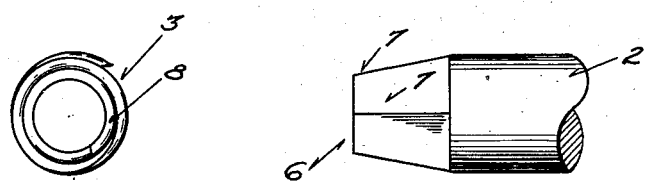
Fig. 2.　　Fig. 4.
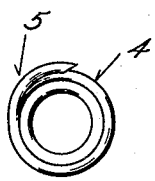　　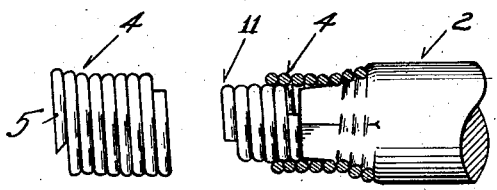
Fig. 3.　　Fig. 5.
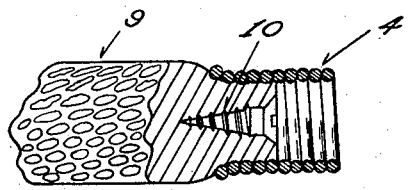
Fig. 6.
INVENTOR.
Julius A. Luther
BY
Oliver B. Kaiser
Atty.

Patented Oct. 5, 1948

2,450,519

UNITED STATES PATENT OFFICE 2,450,519

BELT CONNECTOR

Julius A. Luther, Cincinnati, Ohio

Application March 24, 1944, Serial No. 527,888

1 Claim. (Cl. 24—31)

This invention relates to improvements in driving belts for power transmission of the strap type having its ends secured together by a fastener and to the fastener.

Belt fasteners as heretofore employed either formed obstructions beyond the normal surfaces of the belt, producing shocks and interference to a smooth operation, weakening to the fastened ends of the belt, or extended a substantial distance from the ends materially stiffening the belt along its union.

Difficulty is encountered in their application to obtain the appropriate gauging or sizing of the loop for a most efficient and correct assembly and installation upon the pulleys so as not to be either too loose or too tight, or compensate for any temporary overload imposed upon either of the pulleys. The fasteners generally are only applicable for round leather belting and inapplicable to rubber or a fiber rope or cordage belt, limiting their utility to one class of belting.

An object of the invention is to provide a belt end fastener of extreme reliability and a protection to the belt, having adaptability for installation under proper tension and without undue stretch of the belt material when installing, and for connecting belting of various cross-sectional configuration.

Another object is to provide a belt fastener composed of interconnecting elements each of spiral coil formation and adaptable for quick and secure coupling and uncoupling and each element arranged for convenient connection to a relative end of the belt in a manner offering sufficient security and without any detrimental stiffening of the belt.

Various other features and advantages will be readily apparent and more fully set forth in the following description of the accompanying drawings forming a part hereof, and illustrating a preferred embodiment, in which:

Figure 1 is a plan view of the belt fastener, showing the elements thereof uncoupled, the elements being applied to belt ends.

Figure 2 is an end view of one of the fastener sections having a male end.

Figure 3 is an end view of a belt gripping end of the fastener.

Figure 4 is a plan view of one of the ends of the belt as of leather material and the like.

Figure 5 is a plan view partly in section of a modified form of fastener, uncoupled with the element shown in section applied to an end of a leather belt.

Figure 6 is a sectional view of a portion of a modified form of fastener, the elements thereof being uncoupled, and the element shown in section applied to an end of a woven cordage belt.

Belt fasteners or couplers made of a spirally coiled or helically wound spring wire engaged or bound over the ends of a belt as heretofore contemplated, have been impracticable and inefficient, principally for the reason that they caused an extreme stiffening of the belt at the union, interfering with its smooth and uniform cooperation with the pulley when transmittingly engaged therewith, causing knocks, variation and interruption in speed, resulting in a short life of the coupling due to fracture from the pounding and strain imposed at a point thereof in each period in rounding a pair of pulleys, which multiplied with each higher rate of speed. A fracture of the wire also readily occurred from repeated torsional stress imposed at the same points because the soil has not been permitted to yield to compensate for the disturbing forces. The damage principally resulted from having the convolutions or coils of the wire of an increased or extended diameter from that of the belt and thereby exposed to receive a pounding at each interval when brought into action with the bearing surface of a pulley. As the belts are principally used in connection with grooved pulleys, there is caused a metal-to-metal contact at opposite sides contributable to belt slippage and excessive wear to the wire.

An extended gripping length over or upon the belt and relative extended spacing or spread of the coils, even if imbedded into the belt, destroy the yielding function of the spring, as a unit, stiffening the belt and imposing a torsional stress on the wire at a point immediate of its departure from the belt where the wire joins a closely wound or contact coil formation of the coupling intermediate of the belt gripping end portions thereof.

Referring to the drawings, 1 and 2, respectively, indicate the opposite or coupling ends of a belt, which is shown as of circular cross-section, although it may be representative of other cross-sectional form or contour configuration of the various forms commonly designated as V-belts, some possessing a trapezoidal transverse cross-section. The belt may be of a leather material, a composition of rubber and fabric and cordage, although the description generally will be directed to leather belting as the prevailing type employed which requires some form of coupling for joining its ends, as distinguished from the fabricated endless belts. Fabricated endless belts have largely been resorted to for the lack of an adequate coupler, which however necessitated the manufacture of a large number of stock sizes, and, for many types of apparatus, special sizes, and pulley spacing adjustments for a proper tensioning of the belt.

The improved coupling is preferably of sectional form, to avoid perplexity in the method of connection upon the ends of the belt and for the feasibility of making a quick and convenient assembly without any twist in the belting after assembly which would not be self correcting or stabilizing. It also permits quick coupling and uncoupling and a coupling without over-tensioning the coupling or belting material so that its installation is under the required and most favorable transmission conditions.

In the preferred embodiment the coupling comprises a pair of interconnecting elements as illustrated in Figure 1, which for relative differentiation are designated as a male element 3, and a female element 4. Each element for its main or body portion is of cylindrical, closed spring formation, that is closely wound with the coils in contact. The diameter of the cylinder is less than the normal diameter or cross-sectional dimension of the belting. The body portions of the elements duplicate one another as to their cylindrical dimension and are formed of the same size or gauge of wire. The male element 3, optionally is shown as of greater length axially or longitudinally than the female element 4. Both however combine for an appropriate degree of expansion for a given length of belt to obtain the most efficient result and degree of flexibility without injurious torsional strain. It is thus obvious that the combined length of the elements as a unit is somewhat dependent upon various transmission and power requirements as well as sizes of pulleys upon which the belt is installed.

The elements 3 and 4 have ends of similar construction where they join the respective belt ends, and each comprises, as shown in Figures 3 and 5, what is termed flaring extremity 5, to provide a threading lead and comprising a segmental or partial coil departing outwardly eccentrically from the radius of the body coils so as to extend slightly beyond the perimeter thereof, although preferably within the radius or circumference of the belt. Its end is tapered or beveled from the inside of the cylinder outward to provide a gliding starting edge and runner for an initiating, self-threading connection with the belting.

The end 6, of the belting is cut to a tapering or pyramidal form to provide a plurality of corners 7. As the gliding point of the lead coil segment 5 is started upon the tapered end of the belt the lead is forced to yield to a larger radius. As the radius increases the pressure of the extremity 5 upon the corners of the belt increases, thereby recessing itself into the belting, forming a thread groove or indentation. As the lead segment is advanced upon the tapered end of the belt, the successive coils following the grooving, assist in the threading advance and combine for an increasing grip or clinch upon the belting until advanced sufficiently for the necessary hold.

The corners formed by tapering the ends of the belt to provide a minimum obstruction to the threading advance of the connector, and allow for a sufficient hold easily and readily obtained by compression of the leather rather than by cutting around the belt. As the lead advances upwardly there is a relative spreading of the successive coils, increasing the compacting of the belt and correspondingly increasing its gripping pressure. The action also has a tendency to force the belting material in the crevices or interstices between the coils, increasing the thread hold. The enlargement of the coils stiffens their structure and causes them collectively to assume a tapering or conical form under increasing compacting engagement with one another, thus pinching the belting material forced therebetween; so that the coils are constrained against yield or flex and counteract any self-unthreading loosening action when the belt is in transmission, and prevent any shredding or skiving action upon the belt. The tapering of the belt locates a minimum number of belt gripping coils, corresponding to the sum of the widths of the coils, inwardly from the end of the belting, leaving a protruding margin as a butt to prevent rupture of the belt. The skiving of the ends of the belt to produce the corners is easily manually performed by a common cutting knife, so that no special tools are required. As an example, the skiving for a $\frac{5}{16}$″ diameter leather belt need not extend more than $\frac{1}{4}$″ from the end of the belt, of which about one-half of this length is taken up by three of the coils in gripping engagement upon the belt. As a maximum of three coils is more than ample for a secure connection, there is no appreciable stiffening of the belt nor does the connector extend beyond the traveling surface of the belt.

For interconnection of the sections, to obtain a ready and quick coupling and uncoupling, the male element 3, is provided with a series of end coils 8, functioning as a screw stud of reduced cylindrical closed form, as illustrated in Figure 1, merging from the main or body coils to be integral therewith. As a screw stud portion, the coils possess an outside diameter for a threading intermesh with the internal diameter or internal thread formation of the main coils. The screw portion constituting one and one-half to two coils.

For interconnecting the elements, after they respectively have been applied to the relative ends of the belt, the belt ends preliminarily are turned or twisted for approximately a half turn in counter directions and the ends of the elements are brought into abutting engagement for a threading start, whereupon the belt ends under a return direction of rotation moves the elements into a complete threaded interconnection or union and releases the twist in the belt. The connection automatically tightens under any expanding pressure of the belting or free coils of the unit. The screw-connected coils, for the degree of interlock or intermesh, are resistant against flex with the body coils, and under any expanding pressure of the belt increase their hold upon one another.

As illustrated in Figure 5, the screw element or stud 11 may be in the form of a separable element, which permits the main elements to be of duplicate construction and coupled together by screwing the same upon the stud in relative opposing directions.

In Figure 6, a method is disclosed for fastening the coupling to the ends of a cordage type of belting 9, which does not possess the stability to permit an adequate threading connection thereon alone. In its application, after the ends of the coupling have been engaged upon the ends of the belt, a wood screw 10 is embedded axially into the end of the belt, easily accomplished with the aid of a small conventional screw driver. The screw forces the braided material into the interstices between the coils, internally of the cylinder, effecting an efficient and secure joint.

In its application to a cordage, which when combined with rubber provides for the fabrication of a continuous belting, capable of being cut and assembled for installation in any desired length and production of a belting true to a cross-sectional dimension and outline configuration throughout its length, this eliminates the individual molding of a large number of standard and special sizes of endless belts, and the use of floating and adjustable bearings for tension regulation.

The spring should be dimensioned to offer the same or greater strength than the belt and under normal load upon the belt will remain in its closed state, yielding only when subjected to a tension representing an overload on the belt. The connector generally maintains a constant total length of the belt under normal conditions and expands when subjected to an overload for a slipping action of the belt, to qualify as a safety means.

As the spring cylinder has a diameter within the diameter of the belt the coils are free from any gripping action with the surfaces of the pulley, and therefore are free to move relatively angularly in rounding a curve, avoiding wear of the coils.

The coupling or connector possesses manifold advantages, as the belt can be readily shortened or lengthened by an interchange of inserts; it is noiseless, self-aligning, non-stiffening, adds no appreciable weight, is easily and conveniently replaceable, absorbs shocks in starting and stopping, accommodates for extraordinary overload without strain on belting. It allows installation over pulleys without stretch of belt and permits minute adjustment in belt length by a slight reskiving of one of the belt ends.

When properly installed, the coils are slightly separated by the transmitting pressure, providing a visible indication and accommodation for a degree of self-compensation for the normal wear of the belt, and when the coils assume a fully closed condition it is indicative that a take-up should be made by a slight advance of the connector upon one or both ends of the belt.

Having described my invention, I claim:

A belt connector, as an article of manufacture, consisting of a pair of cylindrical close coiled spring elements, separably coupled by several coils at the terminal of one element of reduced cylindrical dimension forming a stud for a threading engagement into an end of the second element, the coils of the stud having an outside diameter greater than the inside diameter of the coils of the second element cooperating therewith for a coupling union, and the belt joining end of each element, respectively having an end convolution of eccentric form to extend beyond the circumference of the adjoining convolutions for a self-initiating and impinging engagement upon the belt in effecting the union by relative rotative and advancing movements of the belt and connector element.

JULIUS A. LUTHER.

REFERENCES CITED

The following references are of record in the file of this patent:

UNITED STATES PATENTS

| Number | Name | Date |
|---|---|---|
| 266,529 | Root | Oct. 24, 1882 |
| 161,508 | Hare | Mar. 30, 1875 |
| 809,880 | Woolldridge et al. | Jan. 9, 1906 |
| 1,613,193 | Rankin | Jan. 4, 1927 |
| 2,077,309 | Carlsson | Apr. 13, 1937 |

FOREIGN PATENTS

| Number | Country | Date |
|---|---|---|
| 149,496 | Switzerland | Nov. 16, 1931 |
| 369,796 | Germany | Feb. 23, 1923 |